(12) United States Patent
Fransen

(10) Patent No.: US 10,299,119 B2
(45) Date of Patent: May 21, 2019

(54) METHOD AND SYSTEM FOR PROVIDING SECURITY FROM A RADIO ACCESS NETWORK

(71) Applicants: Koninklijke KPN N.V., The Hague (NL); Nederlandse Organisatie voor Toegepast-Natuurwetenschappelijk Onderzoek TNO, s-Gravenhage (NL)

(72) Inventor: Frank Fransen, Zuidhorn (NL)

(73) Assignees: Koninklijke KPN N.V., The Hague (NL); Nederlandse Organisatie voor Toegepast-Natuurwetenschappelijk Onderzoek TNO, The Hague (NL)

( * ) Notice: Subject to any disclaimer, the term of this patent is extended or adjusted under 35 U.S.C. 154(b) by 0 days.

(21) Appl. No.: 15/307,960

(22) PCT Filed: May 1, 2015

(86) PCT No.: PCT/EP2015/059621
§ 371 (c)(1),
(2) Date: Oct. 31, 2016

(87) PCT Pub. No.: WO2015/166099
PCT Pub. Date: Nov. 5, 2015

(65) Prior Publication Data
US 2017/0055153 A1 Feb. 23, 2017

(30) Foreign Application Priority Data
May 2, 2014 (EP) ..................................... 14166880

(51) Int. Cl.
*H04W 12/06* (2009.01)
*H04W 12/04* (2009.01)
(Continued)

(52) U.S. Cl.
CPC ............ *H04W 12/06* (2013.01); *H04L 63/061* (2013.01); *H04W 12/04* (2013.01); *H04W 48/08* (2013.01);
(Continued)

(58) Field of Classification Search
CPC ................. H04L 63/061; H04L 9/0861; H04L 2463/061; H04W 12/04; H04W 12/06; H04W 48/08; H04W 4/22; H04W 4/90
See application file for complete search history.

(56) References Cited

U.S. PATENT DOCUMENTS

2006/0072759 A1*  4/2006 Gundavelli ........... H04L 9/0844
                                                             380/270
2008/0013740 A1*  1/2008 Sowa ...................... H04L 9/083
                                                             380/286
(Continued)

FOREIGN PATENT DOCUMENTS

EP    1819184 A1   8/2007
EP  2 034 661 A1   3/2009
(Continued)

OTHER PUBLICATIONS

European Search Report, European Patent Application No. 14166880.6, dated Aug. 22, 2014, 6 pages.
(Continued)

*Primary Examiner* — Quoc Thai N Vu
(74) *Attorney, Agent, or Firm* — McDonnell Boehnen Hulbert & Berghoff LLP

(57) ABSTRACT

The disclosure relates to a security method in a radio access network system. A shared secret key is stored in both a user device and a core network system. A further secret key is received from the core network system, wherein the further secret key has been derived using the shared secret key stored in the core network system. One or more values are
(Continued)

provided over the radio interface to the user device to derive the further secret key in the user device from at least the shared secret key stored in the user device and one or more of the one or more values provided over the radio interface. An authentication procedure and/or a key agreement procedure is performed for the user device over the wireless radio interface using the received further secret key in the radio access network system and the derived further secret key in the user device.

26 Claims, 11 Drawing Sheets

(51) Int. Cl.
    *H04L 29/06*     (2006.01)
    *H04W 48/08*     (2009.01)
    *H04W 4/90*     (2018.01)
    *H04L 9/08*     (2006.01)

(52) U.S. Cl.
    CPC ...... *H04L 9/0861* (2013.01); *H04L 2463/061* (2013.01); *H04W 4/90* (2018.02)

(56) References Cited

U.S. PATENT DOCUMENTS

| | | |
|---|---|---|
| 2010/0329463 A1 | 12/2010 | Ratliff et al. |
| 2011/0004762 A1* | 1/2011 | Horn .................... H04W 12/04 713/171 |

FOREIGN PATENT DOCUMENTS

| | | |
|---|---|---|
| EP | 1 952 574 B1 | 3/2011 |
| EP | 2 503 754 A1 | 9/2012 |
| GB | 2486461 A | 6/2012 |
| WO | 02/067486 A2 | 8/2002 |
| WO | 02/067486 A3 | 8/2002 |
| WO | WO2011084419 A1 | 7/2011 |
| WO | 2011/134039 A1 | 11/2011 |

OTHER PUBLICATIONS

PCT International Search Report and Written Opinion, PCT International Application No. PCT/EP2015/059621, dated Aug. 12, 2015, 11 pages.

"Terrestrial Trunked Radio (TETRA); Voice Plus Data (V+D); Part 7: Security", ETSI TS 100 392-7, V2.1.1, Dec. 2000, pp. 1-154.

Asaeda, Hitoshi et al., "Structuring Proactive Secret Sharing in Mobile Ad-hoc Networks", 2006 1st International Symposium on Wireless Pervasive Computing, Jan. 16-18, 2006, 6 pages.

"3rd Generation Partnership Project; Technical Specification Group Services and System Aspects; 3G Security; Security Architecture (Release 12)", 3GPP TS 33.102, V12.2.0, Dec. 2014, pp. 1-76.

"3rd Generation Partnership Project; Technical Specification Group Services and System Aspects; 3GPP System Architecture Evolution (SAE); Security Architecture (Release 12)", 3GPP TS 33.401, V12.16.0, Dec. 2015, pp. 1-132.

"3rd Generation Partnership Project; Technical Specification Group Services and System Aspects; Study on Isolated Evolved Universal Terrestrial Radio Access Network (E-UTRAN) Operation for Public Safety (Release 13)", 3GPP TR 22.897, V13.0.0, Jun. 2014, pp. 1-24.

"3rd Generation Partnership Project; Technical Specification Group Services and Systems Aspects; Service Requirements for Machine-Type Communications (MTC); Stage 1 (Release 13)", 3GPP TS 22.368, V13.1.0, Dec. 2014, pp. 1-26.

"3rd Generation Partnership Project; Technical Specification Group Services and System Aspects; Network Architecture (Release 13)", 3GPP TS 23.002, V.13.1.0, Dec. 2014, pp. 1-109.

3rd Generation Partnership Project; Technical Specification Group Services and System Aspects; General Packet Radio Service (GPRS) Enhancements for Evolved Universal Terrestrial Radio Access Network (E-UTRAN) Access, Release 13, 3GPP TS 23.401 V13.1.0, Dec. 2014, pp. 1-310.

Japanese Office Action in Japanese Patent Application No. 2017-508767, dated Feb. 27, 2018.

* cited by examiner

METHOD AND SYSTEM FOR PROVIDING SECURITY FROM A RADIO ACCESS NETWORK

CROSS REFERENCE TO RELATED APPLICATIONS

The present application is a national stage entry of, and claims priority to, PCT/EP2015/059621, filed on May 1, 2015, which claims priority to European Patent Application EP 14166880.6, filed in the European Patent Office on May 2, 2014, both of which are hereby incorporated in their entirety herein by reference.

FIELD OF THE INVENTION

The invention relates to a method and system for providing security from a radio access network of a telecommunications network. More specifically, the invention relates to a method and system for providing security from a radio access network in case security functions are not available or are not obtained from a core network system of the telecommunications network. The invention also relates to a user device and subscriber module applied in the security method.

BACKGROUND

During the last decade, mobile telecommunications has become the predominant form of communications and further growth is expected in the years to come. Mobile telecommunications relies on the existence of a radio access network system providing radio coverage by means of base stations (e.g. (e)NodeBs) in areas through which mobile user devices can move. The base stations are connected to a core network system of a telecommunications network of a telecommunications provider in order to allow communication services to be established. The core network system comprises several further telecommunications nodes.

One such node is the Home Subscriber System (HSS). The HSS has two functions, viz. (1) storing user subscription information and updating this information when necessary and (2) generating security information from one or more secret keys. The secret keys are normally shared between the HSS and the (U)SIM in the user device and should be kept secret, i.e. a shared secret key. Security information is derived using the secret key. The security information is used for device authentication and/or, in 3G and 4G networks, network authentication and to ensure that data transferred over the radio path is encrypted. For 3G networks, a detailed description of the security can be found in 3GPP TS 33.102; for 4G networks in 3GPP TS 33.401.

A new project has been launched in 3GPP to study Isolated E-UTRAN operation for Public Safety (3GPP TR 22.897). The core network system may be unavailable to the radio access network system (i.e. the radio access network system is isolated) for a variety of reasons. A catastrophic event may have occurred (e.g. an earthquake, flooding, explosion) or hardware or software failures may occur in the telecommunications system. In one particular example, the connection link between one or more base stations (that as such are still able to provide radio coverage for the user devices for one or more communication services) and the core network system may be broken. In one other example, the connection link with the base station is operational, but other parts of the core network do not operate appropriately such that the central database cannot be accessed.

Other cases wherein the core network system is not or not continuously available include stand-alone networks providing coverage or additional capacity in some areas that are not or not sufficiently covered by the primary radio access network. A specific example includes military missions where a truck could carry a radio access network enabling communication amongst the military personnel in the area covered by the mobile radio access network.

WO 2011/134039 discloses a method of establishing communication lines during a failure within a mobile communications network. A base station may assume a survivability mode if disruptions are detected. In the survivability mode, survivability components may be activated within a base station that enable communications and services to be provided by the base stations. One survivability component includes an authenticator providing authentication and authorization for mobile devices in the coverage area of the base stations. The authenticator survivability component performs the function of the authentication centre AuC of the core network system and stores the secret keys.

This method is disadvantageous from a security perspective. Whereas the AuC element or AuC part of a core network system is a highly secure and rigorously protected environment, this is less so for base stations. Storing the original secret key in each base station may therefore endanger communication security. If the authenticator survivability component gets compromised, the security of all user devices for which the shared secret key is stored in the base station is compromised.

There exists a need in the art for a more secure solution to provide a local authentication function for a base station or set of base station.

SUMMARY

As will be appreciated by one skilled in the art, aspects of the present invention may be embodied as a system, method or computer program product. Accordingly, aspects of the present invention may take the form of an entirely hardware embodiment, a software embodiment (including firmware, resident software, micro-code, etc.) or an embodiment combining software and hardware aspects that may all generally be referred to herein as a "circuit," "module" or "system". Functions described in this disclosure may be implemented as an algorithm executed by a microprocessor of a computer. Furthermore, aspects of the present invention may take the form of a computer program product embodied in one or more computer readable medium(s) having computer readable program code embodied, e.g., stored, thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a solid-state drive, a random access memory (RAM), a non-volatile memory device, a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this disclosure, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless (using electromagnetic and/or optical radiation), wired, optical fibre, cable, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on a users computer (e.g. a user device) or on a computer facility in a network (e.g. a computer facility in the radio access network system and/or in the core network system), partly on the computer, as a stand-alone software package, partly on the users computer and partly on a computer facility in the network, or entirely on the remote computer or server. In the latter scenario, the remote computer may be connected to the users computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor, in particular a microprocessor or central processing unit (CPU), of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the functions noted in the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts, or combinations of special purpose hardware and computer instructions.

In one aspect, a security method is disclosed for a telecommunications network comprising a radio access network system and a core network system. The radio access network system is configured to provide a wireless radio interface for at least one user device. A shared secret key is stored in both the user device and the core network system, i.e. the shared secret keys are pre-stored therein.

In the disclosed security method, the radio access network receives a further secret key from the core network system. The further secret key has been derived using the shared secret key. The shared secret key remains being stored in the core network system (e.g. in the HSS) and is not transmitted to the radio access network system. The further secret key may be received at the radio access network system from the core network system in a secure manner.

The radio access network system provides one or more values (e.g. random values, parameter values) over the radio interface to the user device enabling the user device to derive the further secret key in the user device from at least the shared secret key (i.e. the key corresponding to the secret key remaining to be stored in the core network system) and the one or more of the one or more values provided over the radio interface. One or more of the one or more values may also have been used for deriving the further secret key in the core network system.

If the further secret key is received at the radio access network system from the core network system and is derived in the user device, at least one of an authentication procedure and a key agreement procedure for the user device may be performed over the wireless radio interface between the user device and the radio access network system using the further secret key. This procedure is also referred to as a local AKA procedure.

In another aspect, a radio access network system of a telecommunications network is disclosed, wherein the radio access network system comprises one or more base stations providing a wireless radio interface for at least one user device. Again, a shared secret key is stored in both the user device and a core network system of the telecommunications network.

The radio access network system comprises a receiver configured for receiving a further secret key from the core network system, wherein the further secret key is derived using the shared secret key stored in the core network system.

The radio access network system further comprises a transmitter configured for providing one or more values over the wireless radio interface to the user device enabling the user device to derive the further secret key in the user device from at least the shared secret key stored in the user device and one or more of the one or more values provided over the radio interface. One or more of the one or more values may also have been used for deriving the further secret key in the core network system.

The radio access network system also contains a computer system configured for performing at least one of an authentication procedure and a key agreement procedure for the user device over the wireless radio interface, using the received further secret key in the radio access network system and the further secret key derived in the user device from one or more of the received values and the shared secret key stored in the user device.

In yet another aspect, a core network system of a telecommunications network is disclosed that is configured for operating with the radio access network system described herein. The core network system comprises a storage for storing the shared secret key and a computer system configured for deriving a further secret key using the stored shared secret key. The core network system also comprises a transmitter configured to transmit at least the derived further secret key to the radio access network system, e.g. in response to a request for establishing at least one of the authentication procedure and the key agreement procedure or pre-provisioning the radio access network system with the further secret key. Optionally, the core network system comprises a storage storing an indication indicating authorization for deriving the further secret key for the user device. One or more of the one or more values transmitted by the radio access network system to the user device may also have been used for deriving the further secret key in the core network system. One or more of the one or more values may also be transferred from the core network access system to the radio access network system.

In a still further aspect, a user device is disclosed configured for operating within the radio access network system disclosed herein.

The user device contains a receiver configured for receiving the one or more values provided over the radio interface from the radio access system and a storage storing the shared secret key. The storage may comprise a (U)SIM.

The user device also contains a computer system configured for deriving the further secret key from the stored shared secret key and at least one of the one or more values received by the receiver. One or more of the one or more values may also have been used for deriving the further secret key in the core network system.

The user device is configured to perform at least one of the authentication procedure and the key agreement procedure using the derived further secret key.

User devices may not only include mobile devices, such as mobile phones, tablets, smart glasses, smart watches, and laptop computers, etc. but also devices known as machine type communications (MTC) devices (see e.g. 3GPP TS 22.368). Operation of some of the latter devices in an isolated or stand-alone RAN system may also be considered essential by government authorities.

In yet another aspect of the present disclosure, a computer program or a suite of computer programs is presented that comprises a set of instructions arranged to cause a computer, or a suite of computers, to perform the method.

In a still further aspect of the present disclosure, a computer medium, e.g. a non-transitory computer medium, is presented storing the computer program.

A further aspect of the present disclosure relates to a subscriber module for use in the user device. The subscriber module, e.g. a (U)SIM, is configured to store the shared secret key and for deriving the further secret key.

It should be appreciated that the radio access network system (e.g. a single base station or a collection of base stations) may comprise a computer system implementing core network functionality enabling user devices to communicate via the radio access network without using the core network of the telecommunications network. As an example, for an LTE radio access network system, the radio access network system may contain at least one of a local mobility management entity (MME) function, a local home subscription system (HSS) and a local authentication centre (AuC) in addition to the conventional eNodeB equipment and functionality. The radio access network system at least contains authentication and/or key agreement (AKA) functionality.

It should also be appreciated that the above-mentioned computer systems comprise hardware circuitry running a computer program for performing the identified tasks.

A key derivation function may be applied in the core network system and the user device to derive the further secret key.

By providing a separate set of further secret keys in the radio access network system and the user device, the disclosed security method and radio access system enables a virtually infinite number of authentication and/or key agreement procedures to be performed for a user device using the generated further secret key without storing the shared secret key in the radio access network system. Accordingly, in case the radio access network system is compromised and the further secret key is revealed, the shared secret key stored in the user device and the core network system does not have to be replaced. Instead, a second further secret key may be applied for the user device using the method disclosed herein for authentication and/or key agreement purposes, thereby making the compromised former further secret key useless.

In an embodiment of the present disclosure, the further secret key received from the core network system is derived using at least one of (i) one or more of the one or more values provided over the radio interface to the user device, (ii) an identifier identifying the radio access network system and (iii) an identifier of the user device. The use of one or more of the values (e.g. a random number RAND or authentication token AUTN) in deriving the further secret key links the further secret key to the authentication or key agreement procedure in which the user device authenticates the core network by means of one or more of the values (e.g. the authentication token AUTN). This ties the further secret key to the authentication of the core network. The use of an identifier identifying the radio access network (which may be a public identifier) ties the further secret key to a particular radio access network system for which the further secret key is generated, making the further secret key inoperable for other radio access network systems. The use of the identifier of the user device (e.g. the IMSI), links the further secret key to a particular user device.

In an embodiment of the present disclosure, the further secret key is received at the radio access network system (e.g. at a base station) in a secure manner. In addition, one or more of the values received from the core network system and to be transmitted to the user device over the radio interface are also received in the secure manner from the core network system. Safe transmission of the further secret key to the radio access network system improves security for the subsequent AKA procedures to be performed using the further secret key. Safe transmission may be performed in any manner known as such to the skilled person. In one embodiment, the further key (and possibly the one or more values received from the core network system) are encrypted using a key known at the radio access network system and the core network system.

In an embodiment of the present disclosure, one or more values of the one or more values to be provided over the radio interface to the user device are received from the core network system as an authentication vector for the user device. This facilitates implementing the generation of the further secret key within the existing AKA procedure. Furthermore, the authentication vector can be used for the first AKA procedure, e.g. to authenticate the core network, whereas subsequent AKA procedures may be performed using the derived further secret key. The user device or the subscriber module may be configured to recognize which one of the shared secret key or the further secret key to use.

The authentication vector may be a vector construed for use in a particular type of telecommunications network.

For GSM/GPRS telecommunications network, a triplet vector is generally used to perform AKA. The triplet vector contains a combination of values (RAND, XRES, $K_c$) that is received by and stored in the radio access network system. A shared secret key K forms the cornerstone for the security mechanisms. The shared secret key K is stored in the user device (usually on the SIM card) and in the core network system, e.g. in the HLR/AuC. The HLR/AuC generates a random number RAND. The RAND and the shared secret key K are used to derive encryption key $K_C$ using a key generation algorithm and to derive an expected response XRES under an authentication algorithm. The combination (RAND, XRES, $K_c$) forms a GSM authentication vector (triplet) transmitted from the core network system to the radio access network system, e.g. a base station.

For UMTS networks, instead of a triplet authentication vector, a quintet authentication vector is generated containing again RAND and expected response XRES together with a cipher key CK, an integrity key IK and an authentication token AUTN, generated from a secret key K. AUTN is generated in a manner known as such. The quintet authentication vector is sent to the radio access network system, e.g. a NodeB.

For 4G Evolved Packet Systems (EPS), the authentication procedure is similar to UMTS networks, although a new key hierarchy is used. The shared secret key K stored in the USIM at the user device side and the AuC at the core network system side, is used to derive the keys CK and IK. CK and IK, in combination with a serving network ID are used to derive a new key, $K_{ASME}$. From this new key, $K_{ASME}$, other encryption and integrity keys are derived for protection of signalling between the user device and the core network system (key $K_{NASenc}$), protection of integrity between the user device and the core network system (key $K_{NASint}$), the RRC signalling and user data transfer over the radio interface, the latter including encryption key $K_{UPenc}$ The security tuple ($K_{ASME}$, AUTN, XRES and RAND) is transmitted from the core network system to the radio access network system, e.g. to an eNodeB.

Besides 2G, 3G and 4G, the disclosed embodiments may be used in other telecommunications networks that comprise an access network system, and a core network system wherein keys are derived from a shared secret key. Such networks may comprise potentially 5G and further generation mobile networks.

Each of the authentication vectors may be transmitted as the one or more values from the core network system to the radio access network system. One or more values of an authentication vector may be stored in the radio access network system (e.g. XRES) and one or more values received at the radio access network system may be transmitted to the user device (e.g. RAND).

In an embodiment of the present disclosure, at least one of the further secret key and one or more of the one or more values at the radio access network system are received from the core network system in response to a trigger. The trigger is optionally provided or received prior to detecting, for the radio access network system, an inability or unavailability of the core network system to handle at least one of the authentication procedure and the key agreement procedure from the core network system. Pre-provisioning of at least one of the further secret key and the one or more values enables AKA procedures to be performed locally in the radio access network at any time.

In another embodiment, at least one of the further secret key and one or more of the one or more values is requested by the radio access network system from the core network system. The request may contain an identifier of the particular radio access network for which the further secret key is required.

These embodiments enable or facilitate transfer of the further secret key and/or one or more of the one or more values to the radio access network system.

In an embodiment of the present disclosure, a RAN_only indication is transmitted onto the wireless radio interface, e.g. using broadcast or in user device specific transmission on e.g. a dedicated or shared channel, to inform the user device that only local AKA procedures are available. The RAN_only indication may be used by the user device as information that the further secret key should be derived and/or that the user device may request local AKA with the radio access network system.

In an embodiment of the present disclosure, the radio access network system transmits an identifier onto the radio interface identifying the radio access network system. The radio access network identifier can be used for deriving the further secret key in the user device so as to tie the further secret key to the particular radio access network system. The identifier of the radio access network system may be processed and/or stored in the subscription module for use in deriving the further secret key.

In an embodiment of the present disclosure, the radio access network system receives an indication from the user device indicating capability of the user device to derive the further secret key. This embodiment provides information to the radio access network whether the user device is capable of performing future authentication and/or key agreement procedures with the radio access network system using the further secret key. This information may be received from the user device at any time, e.g. in response to receiving a RAN_only indication from the radio access network system and/or in an attach request to the radio access network system.

In an embodiment of the present disclosure, the radio access network system receives a connection request from the user device and determines from the connection request or in response to receiving the connection request that the at least one of the authentication procedure and the key agreement procedure is to be performed from the radio access network system. The connection request (e.g. an attach request) may include an identifier of the radio access network system it wants to connect to. The radio access network system may also determine for the particular connection request (e.g. based on the IMSI contained in the request) that a local authentication and/or key agreement procedure is to be performed, e.g. when the further secret key and/or the one or more values are already contained in the radio access network system.

The invention can also be applied when the core network system is available to the radio access network system but not used for authentication and/or key agreement. An advantage of using the radio access network system, even if the core network system is available, would be that the further secret key can be pre-loaded in the radio access network system, e.g. during non-busy hours, reducing signalling in the core network during busy hours. Also, the authentication and/or key agreement procedure would be performed faster locally if the further secret key vector is pre-loaded in the radio access network system.

Whereas generally, authentication and key agreement (also referred to as AKA) are both performed, it should be appreciated that the radio access network system as disclosed herein may perform only one of these procedures, e.g. only authentication or only key agreement.

In one example, authentication refers to the verification of the identity of the user device and the network.

In one example, key agreement refers to the procedure to establish at least one key for cryptographically protecting data and/or signalling over the wireless radio interface.

It is noted that the invention relates to all possible combinations of features recited in the claims.

BRIEF DESCRIPTION OF THE DRAWINGS

Aspects of the invention will be explained in greater detail by reference to exemplary embodiments shown in the drawings, in which.

DETAILED DESCRIPTION OF THE DRAWINGS

Figure 1:
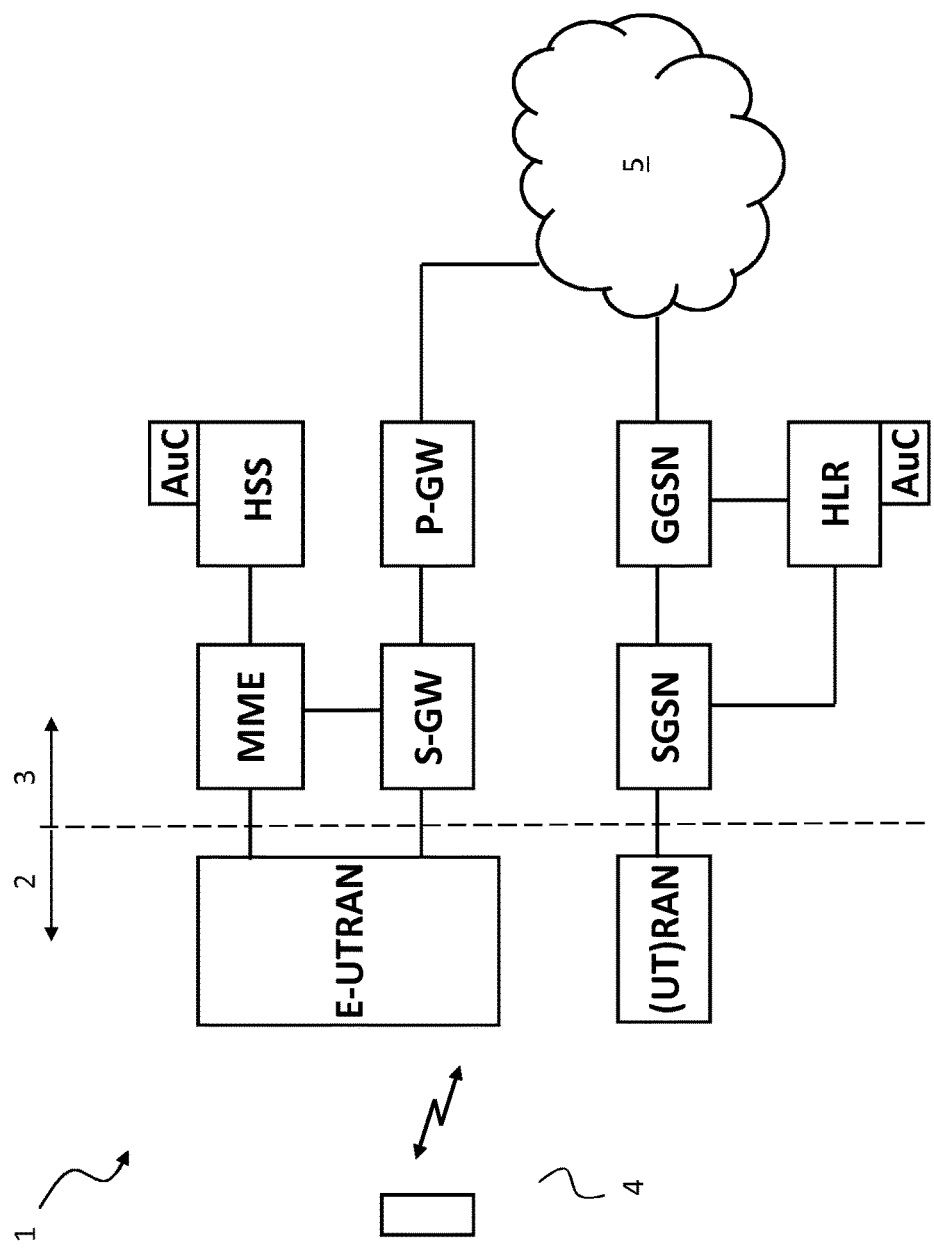
FIG. 1 is a schematic illustration of a telecommunications network comprising a radio access network and a core network.

FIG. 1 shows a schematic illustration of a telecommunications system 1. The telecommunications system 1 comprises a radio access network 2 (also indicated as E-UTRAN or RAN in FIG. 1) and a core network 3 containing various elements or nodes as described in further detail below.

In the telecommunications system of FIG. 1, three generations of networks are schematically depicted together for purposes of brevity. A more detailed description of the architecture and overview can be found in 3GPP TS 23.002 which is included in the present application by reference in its entirety.

The lower branch of FIG. 1 represents a GPRS or UMTS telecommunications network.

For a GSM/GPRS telecommunications network, a radio access network 2 comprises a plurality of base stations (combination of a BSC and a BTS) and one or more Radio Network Controllers (RNCs), not shown individually in FIG. 1. The core network 3 comprises a Gateway GPRS Support Node (GGSN), a Serving GPRS Support Node (SGSN, for GPRS) or Mobile Switching Centre (MSC, for GSM, not shown in FIG. 1), a Home Location Register (HLR) combined with an Authentication Centre (AuC). The HLR contains subscription information for user devices 4 and the AuC contains a shared secret key K to be used for authentication and key agreement (AKA) procedures.

For a UMTS radio access network (UTRAN), the radio access network 2 also comprises a Radio Network Controller (RNC) connected to a plurality of NodeBs, also not shown. In the core network 3, the GGSN and the SGSN/MSC are conventionally connected to the HLR/AuC that contains subscription information and shared secret keys K of the user devices 4.

It should be noted that the RNC functionality in GSM and UMTS networks is formally part of the RAN. The RNC functionality may be implemented in one or more base stations. Such a configuration is known as a collapsed architecture.

The upper branch in FIG. 1 represents a next generation telecommunications network, commonly indicated as Long Term Evolution (LTE) system or Evolved Packet System (EPS).

The radio access network 2, indicated as E-UTRAN, comprises evolved NodeBs (eNodeBs or eNBs) providing wireless access for a device 3. The core network 3 comprises a PDN Gateway (P-GW) and a Serving Gateway (S-GW). The E-UTRAN of the EPS is connected to the S-GW via a packet network. The S-GW is connected to a Home Subscriber Server HSS and a Mobility Management Entity MME for signalling purposes. The HSS includes a subscription profile repository SPR and is combined with an Authentication Centre (AuC) that stores a shared secret key K for AKA procedures.

For GPRS, UMTS and LTE telecommunications network, the core network 3 is generally connected to a further packet network 5, e.g. the internet, using e.g. a gateway (e.g the P-GW).

Further information of the general architecture of a EPS network can be found in 3GPP TS 23.401.

Of course, architectures other than defined by 3GGP, e.g. WiMAX, can also be used within the context of the present disclosure.

Figure 2:
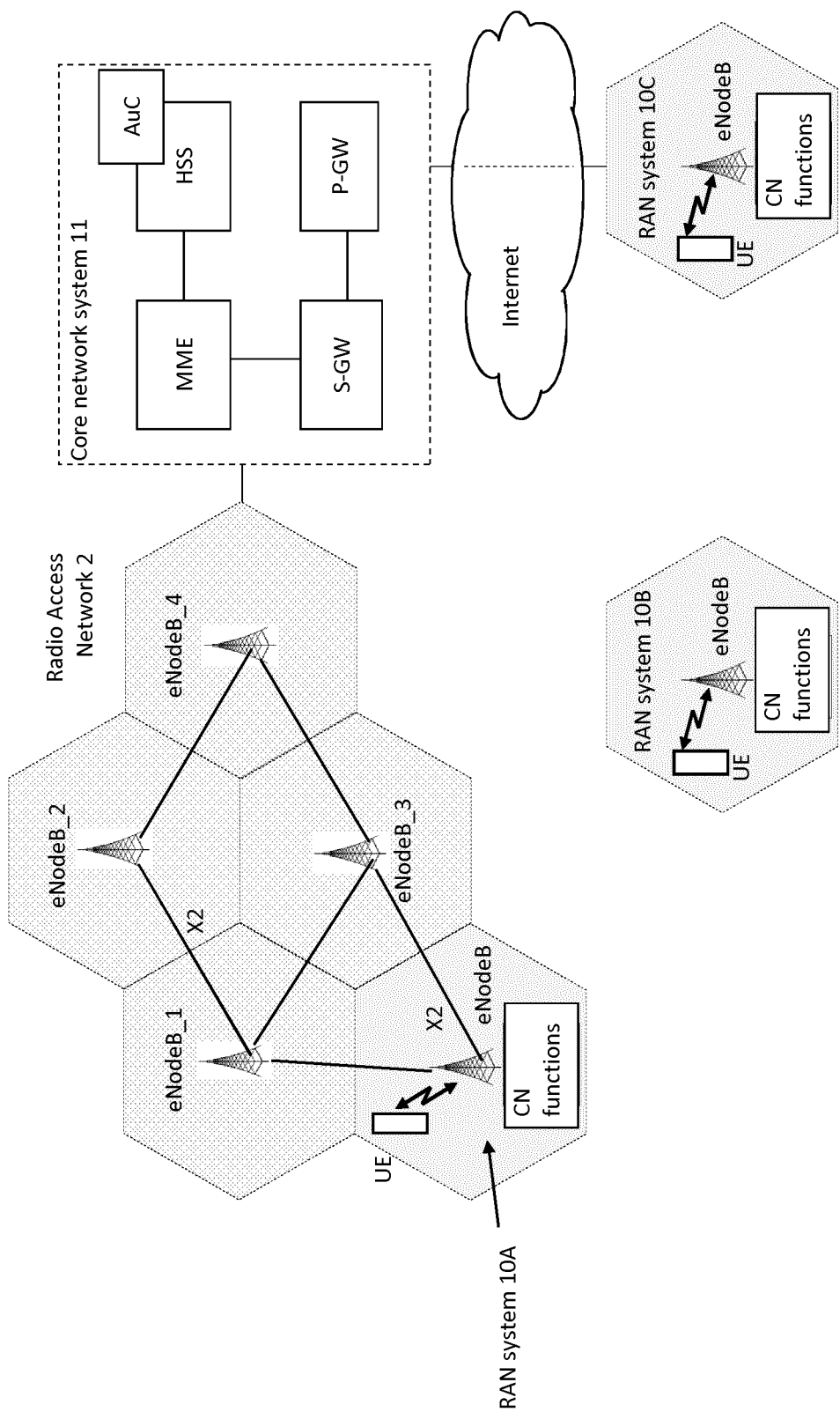
FIG. 2 is a schematic illustration of various cases of radio access network systems at least comprising AKA functionality according to embodiments of the present disclosure.

FIG. 2 is a schematic illustration of various cases of radio access network systems at least comprising local authentication and/or key agreement functionality according to embodiments of the present disclosure for an LTE telecommunications system.

RAN system 10A is a radio access network system forming a cell of the radio access network 2 formed of eNodeBs, here eNodeB_1, eNodeB_2, eNodeB_3 and eNodeB_4.

However, when there is no connection between RAN system 10A and core network system 11, RAN system 10A can provide communication services with the core network functionality of its own.

RAN system 10B is an isolated radio access network system, i.e. a radio access system forming one or more cells separate from the radio access network 2.

RAN system 10C is an stand-alone radio access network system not forming a cell of radio access network 2 but with (some) connectivity to the core network system 11 (e.g. over the internet).

Each of the RAN systems, generally denoted with reference numeral 10, is enabled to provide communication services for a user device UE. A RAN system provides wireless radio coverage and may comprise one or more base station, antennas, core network functions and support for local services. A RAN system 10 may transmit an identifier of its own, i.e. an identifier different from the PLMN_ID of the radio access network 2. The identifier may indicate that RAN system 10 is a sub-network of radio access network 2. As illustrated by the various cases in FIG. 2, RAN system 10 may be intended for stand-alone use providing coverage or additional capacity where coverage was never present (e.g. in case of forest fire, or underground rescue) or where, for example, due to natural disaster coverage is no longer present. A specific example is the use case of military mission in developing country, where a truck could carry a radio access network system 10 requiring specific measures to ensure that when the local authentication core network function of the radio access network system gets captured by the adversary, it does not lead to compromise of the system as a whole.

Figure 3A:
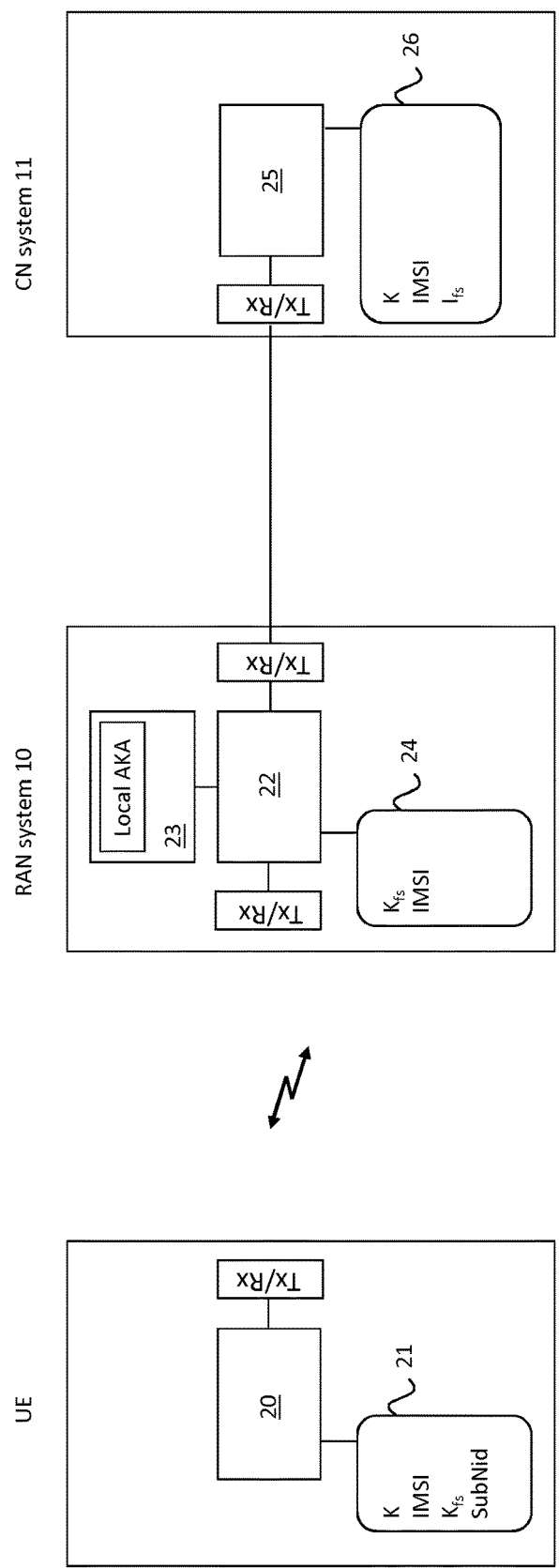
FIGS. 3A and 3B are schematic illustrations of various hardware components and functionality of these components as disclosed herein.
Figure 3B:
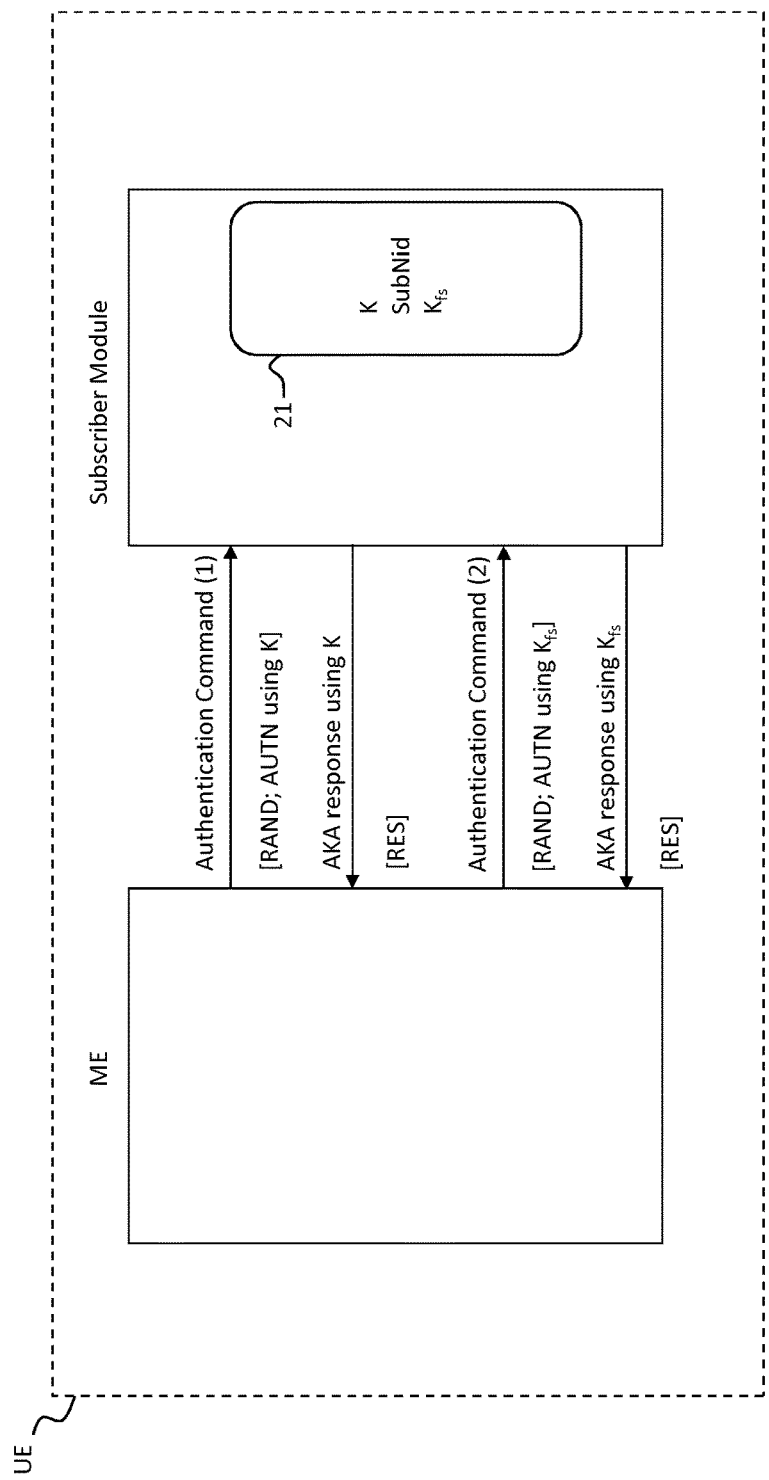

FIGS. 3A and 3B are schematic illustrations of various hardware components and functionality of these components as disclosed herein.

In FIG. 3A, a block diagram of a user device UE, a radio access network system 10 and a core network system 11 is depicted. Each of these contains hardware circuitry able to process computer code to perform one or more of the functions described in further detail below.

The user device UE comprises a transmitter/receiver Tx/Rx for information transmission over the wireless radio interface provided by radio access network system 10. Radio access network system 10 has a corresponding transmitter/receiver. Examples of information transmitted over the radio interface include at least one of the identifier SubNid of RAN system 10 and one or more values (e.g. a random number RAND and an authentication parameter AUTN) to be used by the user device UE to derive a further secret key $K_{fs}$.

User device UE further comprises a computer system (e.g. a processor) 20 and a storage 21. Initially, storage 21 at least comprises a shared secret key K and an identifier of the user device UE (e.g. the IMSI). During operation of the method disclosed herein, storage 21 may further store at least one of the further secret key $K_{fs}$ and the identifier SubNid.

Further details of an example of operation of the user device are described with reference to FIG. 3B.

RAN system 10 further comprises a computer system 22, one or more core network functions (indicated by block 23) and a transmitter/receiver (Tx/Rx) for information exchange with core network system 11. The core network functions of the RAN system may contain at least one of a local mobility management entity (MME) function, a local home subscription system (HSS) and a local authentication centre (AuC) in addition to the conventional eNodeB equipment and functionality. The radio access network system at least contains authentication and/or key agreement (AKA) functionality, as indicated in FIG. 3A. RAN system 10 also contains a storage 24. During operation of the method as disclosed herein, storage 24 of RAN system 10 stores at least a further secret key $K_{fs}$.

Core network system 11 comprises at least a transmitter/receiver (Tx/Rx) enabling information exchange with the RAN system 10. Core network system 11 may comprise a plurality of different entities, e.g. a subscriber system (e.g. an HSS), an authentication system (e.g. an AuC) and/or a mobility management system (e.g. an MME). The core network system 11 comprises a computer system 25 and a storage 26. Computer system 25 and storage 26 may include subscriber system functionality corresponding to an HSS. Storage 26 contains the shared secret key K (which remains stored in the core network system 11 during operation of the disclosed method). Storage 26 may also contain an indication $I_{fs}$ indicating that for a particular user device UE the further secret key $K_{fs}$ may be generated and/or transmitted to the radio access network system 10.

FIG. 3B is a schematic embodiment of user device UE comprising a mobile entity ME and a subscriber module showing exemplary internal communications. The subscriber module may comprise a subscriber identity module, e.g. a SIM or USIM. The subscriber module is a secure module storing e.g. the shared secret key K. Computer system 20 may be distributed amongst mobile entity ME and the subscriber module. The subscriber module may comprise storage 21 initially storing at least shared secret key K and an identifier such as the IMSI. During or after performing of the disclosed method, the subscriber module may contain the further secret key $K_{fs}$ and/or the identifier of the RAN system 10 SubNid. Communications between the mobile entity ME and the subscriber module will be further described with reference to FIG. 4B.

Figure 4B:
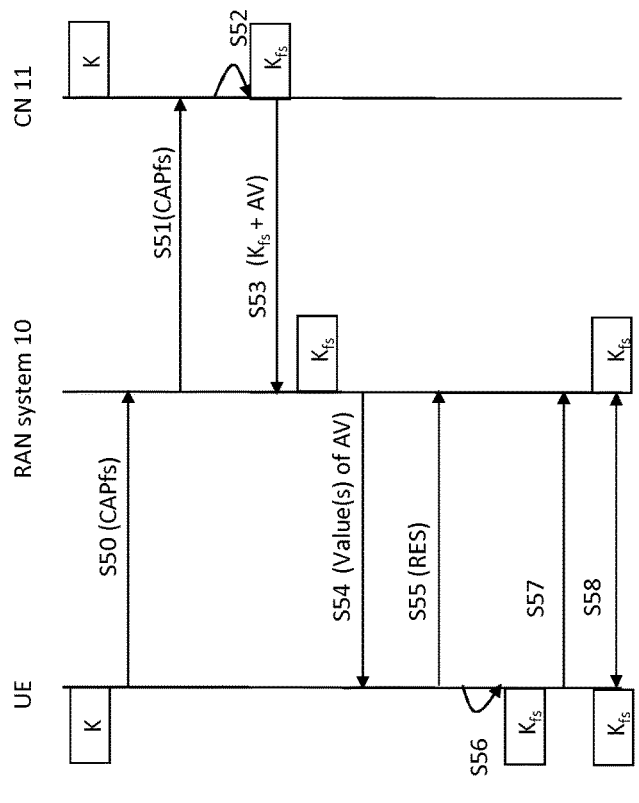
FIGS. 4A-4C provide time diagrams illustrating exemplary steps of security methods disclosed herein.
Figure 4A:
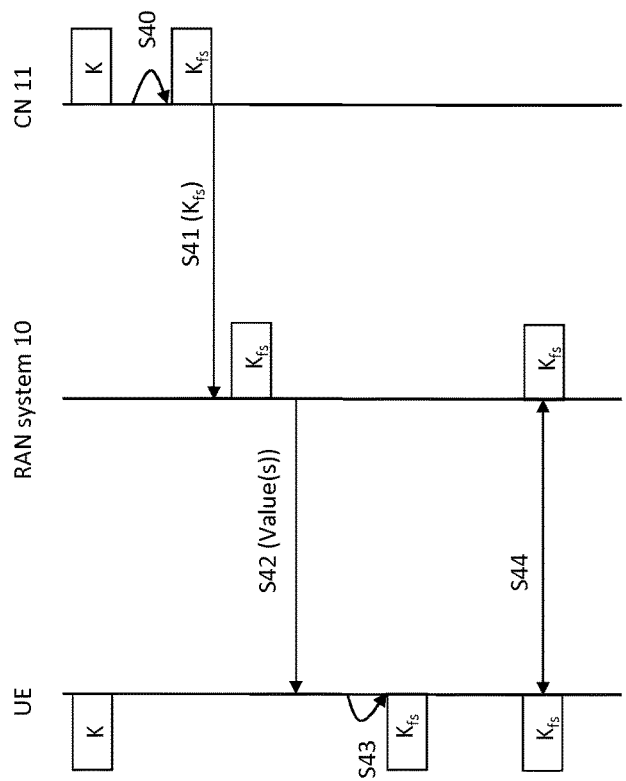

FIG. 4A is a time diagram illustrating a few steps in accordance with the disclosed security method. Initially, both user device UE and core network system 11 have stored shared secret key K as indicated, e.g. in storage 21 of the subscriber module of the UE and in storage 26 (e.g. the HSS) of core network system 11. Shared secret keys K remain stored therein during performing the disclosed method.

At some point in time, e.g. caused by a trigger internal or external from the core network system 11, a further secret key $K_{fs}$ is generated in the core network system 11 in step S40, e.g. using computer system 25. The further secret key $K_{fs}$ is generated with an algorithm using shared secret key K as an input. One example of generating further secret key $K_{fs}$ is described with reference to FIG. 7A. In step S41, the further secret key $K_{fs}$ is transmitted from the core network system 11 to the radio access network system 10.

The trigger for causing generation of the further secret key $K_{fs}$ may e.g. be an expiring timer or other type of time indication. One reason for generating the further secret key $K_{fs}$ and transmitting the further secret key $K_{fs}$ to the radio access network system 10 is to enable radio access network system 10 to provide local AKA services in a secure manner.

The RAN system 10 receives the further secret key $K_{fs}$ and stores the further secret key $K_{fs}$ for further use, e.g. in storage 24. RAN system 10 transmits one or more values to the user device UE enabling user device in step S42 that enable user device UE to derive the further secret key $K_{fs}$ in step S43 also using shared secret key K stored in the user device UE. One example of generating further secret key $K_{fs}$ is described with reference to FIG. 7B.

One or more of the one or more values to be transmitted from the RAN system 10 to the user device UE may be received from the core network system 11 and may include e.g. random number RAND. The values may also be pre-stored in the RAN system 10. Similarly, the further secret key $K_{fs}$ may also be pre-stored in RAN system 10.

In step S44, at least one of an authentication procedure and a key agreement procedure for the user device UE may be performed over the wireless radio interface between the user device UE and the radio access network system 10 using the further secret key $K_{fs}$. This procedure is also referred to as a local AKA procedure.

By providing a separate set of further secret keys $K_{fs}$ in the radio access network system 10 and the user device UE, the disclosed security method and radio access system enables a virtually infinite number of local authentication and/or key agreement procedures to be performed for a user device UE using the generated further secret key $K_{fs}$ without storing the shared secret key K in the radio access network system 10. Accordingly, in case the radio access network system 10 is compromised and the further secret key $K_{fs}$ is revealed, the shared secret key K stored in the user device UE and the core network system 11 does not have to be replaced. Instead, a second further secret key may be applied for the user device UE using the method disclosed herein for authentication and/or key agreement purposes, thereby making the compromised former further secret key $K_{fs}$ useless.

FIG. 4B is a time diagram illustrating another exemplary method of a security method. Again, both user device UE and core network system 11 have pre-stored shared secret key K as indicated, e.g. in storage 21 of the subscriber module of the UE and in storage 26 (e.g. the HSS) of core network system 11. Shared secret keys K remain stored therein during performing the disclosed method.

In step S50, RAN system 10 receives a first attach request from user device UE. The attach request may contain an indication CAP(fs) indicating that user device UE is capable of performing a local AKA procedure, i.e. user device UE is capable of deriving further secret key $K_{fs}$. The attach request is forwarded to core network system 11 containing the indication causing core network system 11 to generate the further secret $K_{fs}$ in step S52. The further secret key $K_{fs}$ is generated with an algorithm using shared secret key K as an input. In addition, one or more values of an authentication vector AV are used to generate the further secret key $K_{fs}$. Examples of authentication vectors have been described in the summary of the present disclosure. One example of generating the further secret key $K_{fs}$ is described with reference to FIG. 7A.

In step S53, both the further secret key $K_{fs}$ and the authentication vector AV are transmitted from the core network system 11 to the RAN system 10. Transmission of the further secret key $K_{fs}$ and the authentication vector AV may be performed in a secure manner. The further secret key $K_{fs}$ and one or more values of the authentication vector AV are stored in the RAN system 10.

In step S54, at least some values of the authentication vector AV are transmitted from RAN system 10 to the user device UE. Examples of such values include RAND and AUTN. In one embodiment, transmission of RAND and/or AUTN is sufficient to perform the disclosed security method, i.e. to derive the further secret key $K_{fs}$ in the user device UE. An additional advantage is that the security method can be integrated within the existing AKA procedure.

One or more of the received values have also been used to generate the further secret key $K_{fs}$ in the core network system 11. User device UE may be configured to exploit the received values both for performing an initial conventional AKA, i.e. to verify AUTN and to generate RES, as well as to derive the further secret key $K_{fs}$. Legacy user devices, i.e. user device not configured to derive the further secret key $K_{fs}$, are still able to perform the AKA procedure once.

Referring now also to FIG. 3B, subsequent to step S54, the mobility entity of user device UE may transmit Authentication Command (1) to the subscriber module. Authentication Command (1) contains AV values RAND and AUTN that have been generated in the core network system 11 using K. AUTN is verified in the subscriber module to authenticate the RAN system 10. The subscriber module returns an AKA response containing RES that has been derived in a conventional manner using shared secret key K stored in storage 21. In step S55, the UE transmits RES to the RAN system 10 enabling RAN system 10 to authenticate the user device UE in a manner known as such.

The value(s) of the AV may also be used to derive the further secret key $K_{fs}$ in the UE using shared secret key K as well as indicated by step S56. The further secret key $K_{fs}$ may be used for subsequent authentication and/or key agreement procedures.

A subsequent AKA procedure may be triggered by a new attach request, indicated as step S57. The attach request may contain an indication that the further secret key $K_{fs}$ has been derived and, upon receiving the attach request, RAN system 10 may detect it has stored already a further secret key $K_{fs}$ for the particular user device UE, thereby obviating the need to request the core network system 11 for a further secret key $K_{fs}$.

In step S58, a local AKA procedure is performed using further key $K_{fs}$ to generate an authentication vector. As illustrated in FIG. 3B, a second Authentication Command (2) is generated contain values of the authentication vector obtained using the further secret key $K_{fs}$. An AKA response is received from the subscriber module containing RES derived using the further secret key $K_{fs}$.

In FIG. 3B, the mobile entity ME indicates to the subscriber module that the Authentication Command should be executed and that the further secret key $K_{fs}$ should be derived, e.g. for a particular RAN system 10 identified by identifier SubNid. For subsequent AKAs by that RAN system 10, the mobile entity ME indicates to the subscriber module that the Authentication Command should be executed using the further secret key $K_{fs}$ for the particular RAN system identified by SubNid. Therefore, the first Authentication Command may signal to the subscriber module that the shared secret key K should be used to verify AUTN and to calculate RES as well as to derive the further secret key $K_{fs}$, whereas further Authentication Commands signal to the subscriber module that the further secret key $K_{fs}$ is used to verify AUTN and to calculate RES.

The mobile entity ME can perform signalling in different manners. For instance, particular bits in parameter P2 of the AUTHENTICATE APDU may be used. Furthermore, the mobile entity ME may provide the subscriber module with the identifier SubNid of the RAN system 10. This could be done as a authentication related data in the AUTHENTICATE command. The subscriber module could also contain an Elementary Field (EF) for the SubNid that may be referred to as $EF_{SUBNID}$. The mobile entity uploads the identifier SubNid in this EF before giving the Authentication Commands. The subscriber module may use the SubNid stored in $EF_{SUBNID}$ in the calculation of the further secret key $K_{fs}$ in case of the first Authentication Command (1) and will retrieve the further secret key $K_{fs}$ associated with the SubNid stored in $EF_{SUBNID}$ in case of further Authentication Commands (2).

Figure 4C:
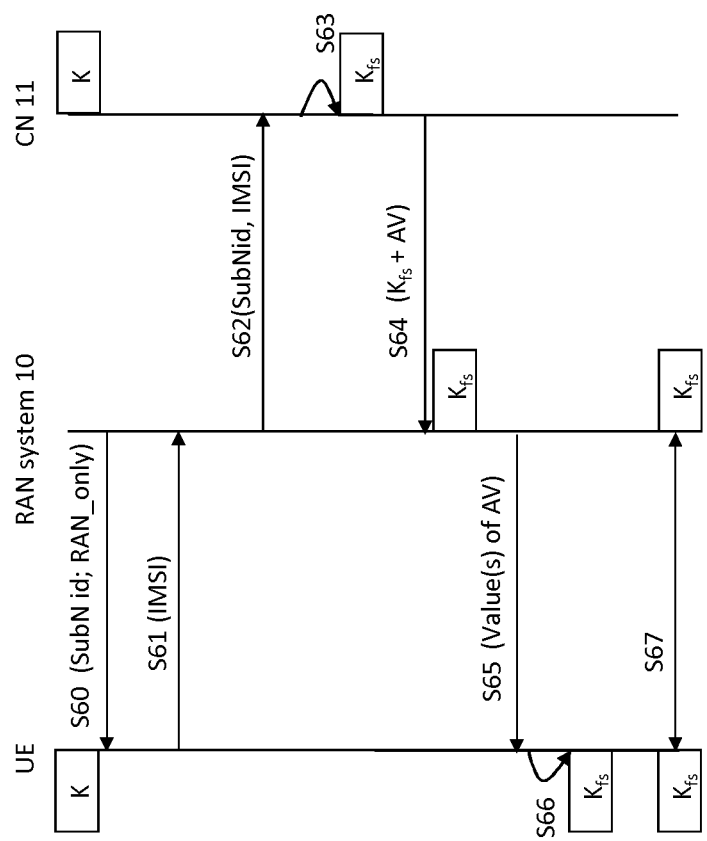

FIG. 4C provides yet another exemplary time diagram illustrating as security method. Yet again, both user device UE and core network system 11 have pre-stored shared secret key K as indicated, e.g. in storage 21 of the subscriber module of the UE and in storage 26 (e.g. the HSS) of core network system 11. Shared secret keys K remain stored therein during performing the disclosed method.

In step S60, RAN system 10 broadcasts an identifier SubNid and a RAN_only indication. The identifier SubNid, as already explained above, identifies the particular RAN system 10. The RAN_only indication may be used by the user device UE as information that the further secret key $K_{fs}$ should be derived and/or that the user device UE may request local AKA with the radio access network system. The RAN_only indication does not necessarily imply that the RAN system 10 cannot reach the core network system 11 as can be observed from FIG. 4C. It should also be noted that one of SubNid and the RAN_only indication may be sufficient for the user device to be aware that the further secret key $K_{fs}$ may or should be generated.

In step S61, the user device UE transmits an attach request to the RAN system 10 containing the identifier IMSI. The attach request may be triggered in response to receiving at least one of the SubNid and the RAN_only indication.

Step S62 illustrates a request from the RAN system 10 to the core network system 11 to generate a further secret key $K_{fs}$ for the RAN system 10 identified by SubNid.

In step S63, the core network system first consults storage 26 to verify presence of $I_{fs}$ for the user device UE. This may be done on the basis of the IMSI contained in the attach request S61 and request S62. If it is determined that the user device UE is entitled to have generated a further secret key $K_{fs}$ for, the further secret key $K_{fs}$ is generated using shared secret key K and one or more values of authentication vector AV.

In step S64, both the further secret key $K_{fs}$ and the authentication vector AV are transmitted from the core network system 11 to the RAN system 10. Transmission of the further secret key $K_{fs}$ and the authentication vector AV may be performed in a secure manner. The further secret key $K_{fs}$ and one or more values of the authentication vector AV are stored in the RAN system 10.

In step S65, at least some values of the authentication vector AV are transmitted from RAN system 10 to the user device UE. Examples of such values include RAND and AUTN. In one embodiment, transmission of RAND and/or AUTN is sufficient to perform the disclosed security method, i.e. to derive the further secret key $K_{fs}$ in the user device UE. An additional advantage is that the security method can be integrated within the existing AKA procedure.

One or more of the received values have also been used to generate the further secret key $K_{fs}$ in the core network system 11. User device UE may be configured to exploit the received values both for performing an initial conventional AKA, i.e. to verify AUTN and to generate RES, as well as to derive the further secret key $K_{fs}$. Legacy user devices, i.e. user device not configured to derive the further secret key $K_{fs}$, are still able to perform the AKA procedure once.

The value(s) of the AV may also be used to derive the further secret key $K_{fs}$ in the UE using shared secret key K as well as indicated by step S66. The further secret key $K_{fs}$ may be used for subsequent authentication and/or key agreement procedures.

In step S67, a local AKA procedure is performed using further key $K_{fs}$ to generate an authentication vector.

In any of the methods described with reference to FIGS. 4A-4C, the RAN system 10 is enabled to provide secure communication services after performing the local AKA procedure S44, S58, S67.

The disclosed method provides for securely establishing a further secret key $K_{fs}$ between the user device UE and a RAN system 10 (e.g. a local authentication centre AuC thereof). The further secret key can be used for local AKA procedures in any of the cases illustrated in FIG. 2.

The further secret key $K_{fs}$ can be established when the user device UE is present and the RAN system 10 is still connected to the core network system 11. The further key $K_{fs}$ may also be established in the absence of the user device UE, wherein the RAN system 10 requests the further secret key $K_{fs}$ and the one or more values (of e.g. the authentication vector AV) beforehand.

Figure 5:
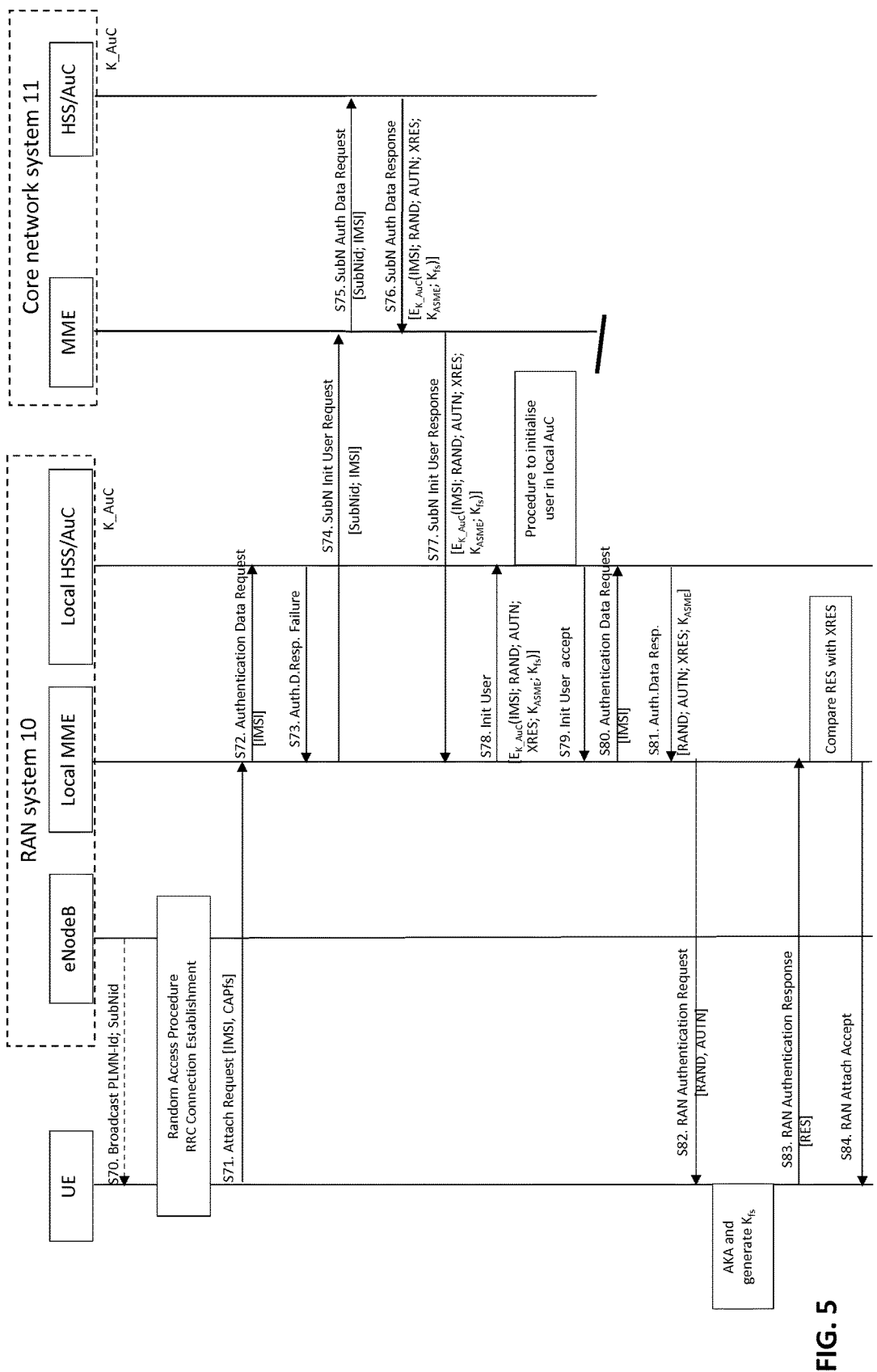
FIG. 5 provides a time diagram illustrating a more detailed security method wherein a connection of the radio access network system to the core network is available.

FIG. 5 provides a time diagram illustrating a more detailed security method wherein the user device UE is present and a connection of the radio access network system to the core network is available. In this case, the user device UE wants to attach to the RAN system 10 that is still connected to the core network system 11 (either as part of the radio access network as illustrated by RAN system 10A in FIG. 2 or as stand-alone RAN system 10C as illustrated in FIG. 2). The Local AuC of RAN system 10 and the user device UE do not share the further secret key $K_{fs}$ yet. In FIG. 5, the several core network functions of RAN system 10, illustrated as block 23 in FIG. 3A, are distinguished as local MME and local HSS/AuC. Similarly, an MME and a HSS/AuC are illustrated as part of the core network system 11.

In step S70, the eNodeB is in RAN-only operation. The eNodeB will broadcast the PLMN_ID of the radio access network and identifying itself as a RAN system 10 associated with the radio access network (i.e. a subnetwork), by identifier SubNid via broadcast. Identifier SubNid can also be communicated to the user device UE during interaction with the user device.

In step S71, the user device UE has selected the RAN system 10 based on the PLMN_ID and sends an attach request message to establish a connection with the RAN system 10. The eNodeB forwards the request to the Local MME function of the RAN system 10. The Local MME will request authentication data for this particular IMSI from the Local HSS/AuC of the RAN system 10 in step S72.

If the user device has not yet established a further secret key $K_{fs}$ with the Local AuC of the RAN system 10 yet (the core network system 11 did not yet provide an authentication vector AV with a further secret key $K_{fs}$ yet), the Local HSS will respond with a failure message in step S73.

In one example, illustrated in FIG. 5, the RAN system 10 request the core network system 11 to provide the further secret key $K_{fs}$ and the authentication vector. In another example, not shown in FIG. 5, the core network system 11 sets up a (secure) connection and uploads the further secret key $K_{fs}$ and the authentication vector to the RAN system 10 for a particular IMSI.

Figure 7A:
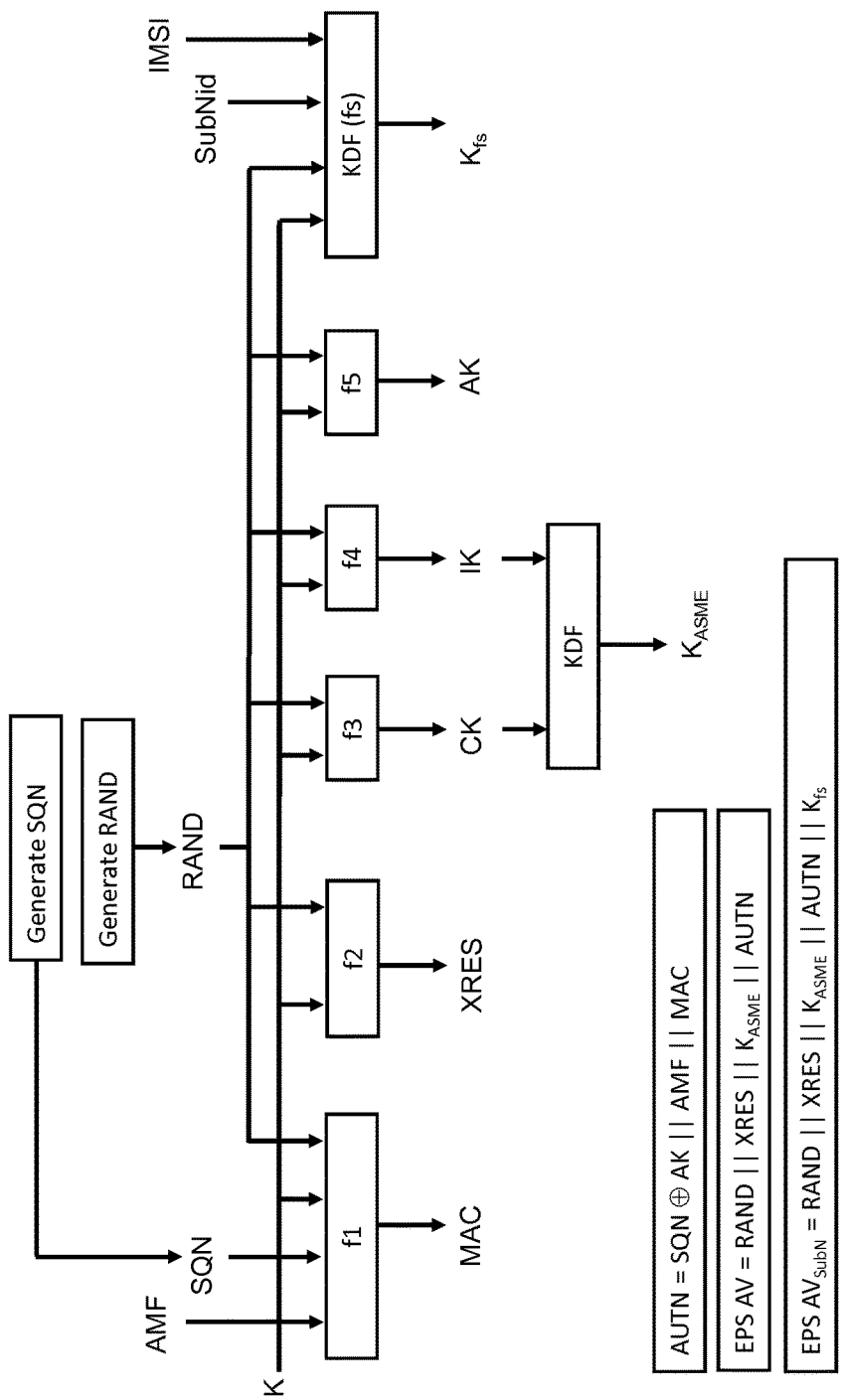
FIGS. 7A and 7B illustrate generation and derivation of the further secret key in the core network system and the user device, respectively, along with other authentication vector values.

In step S74, the local MME of the RAN system 10 requests the core network system 11 to initiate a particular subscriber (identified by the IMSI) at the RAN system 10 by providing an authentication vector AV and a further secret key $K_{fs}$ for this IMSI in the Local AuC. The local MME provides the identifier SubNid of RAN system 10 to the MME of the core network system 11. In step S75, the MME of the core network system 11 transmits a Sub-Network Authentication Data Request to the HSS/AuC of the core network system 11 enabling the HSS/AuC to verify whether the subscriber has the particular service of establishing a further secret key $K_{fs}$ (alternatively, this verification may also be performed by the MME in the core network system based on the subscriber profile received from the HSS). If the service is available for the IMSI, the AuC in the core network system calculates the values of $K_{AMSE}$, AUTN, XRES, and RAND for the authentication vector and the further secret key $K_{fs}$ and encrypts these with the key K_AuC for the Local AuC of the RAN system 10. Both the values of the authentication vector AV and the further secret key $K_{fs}$ are obtained using the shared secret key K stored in the HSS/AuC as illustrated in FIG. 7A.

It should be appreciated that there exist many cryptographic security protocols that can be used to secure the transfer of the AV and the further secret key $K_{fs}$ from the AuC to the Local AuC (e.g. the Secure Channel Protocol from GlobalPlatform). In this example the data is simply encrypted with a shared secret key K_AuC.

In step S77, the MME of the core network system 11 sends the authentication vector AV and the further secret key $K_{fs}$ to the local MME of the RAN system 10. The local MME initiates the subscriber by sending a command with the encrypted authentication vector AV and the further secret key $K_{fs}$ to the local HSS & AuC in step S78.

The local AuC will decrypt the encrypted authentication vector AV and the further secret key $K_{fs}$ using key K_Auc and store the IMSI and further secret key $K_{fs}$. The local HSS will store the IMSI, authentication vector AV and indicate that this subscriber does not yet have the further secret key $K_{fs}$. If the initialisation was successful the local HSS will respond to the local MME with an accept message as indicated by step S79.

The local MME may now proceed with the attach request of step S71 from the user device UE and again request authentication data for this particular IMSI from the local HSS/AuC in step S80. The local HSS may respond in step S81 with the authentication vector AV.

In step S82, the local MME of RAN system 10 can now send a Authentication Request to the user device UE and send the values of RAND and AUTN in a manner known as such. In the case of FIG. 5, the identifier SubNid of the RAN system 10 was already received by the user device UE in step S70. Alternatively, the identifier SubNid may be transmitted to the user device UE with the values of the authentication vector AV in step S82.

In response to step S82, the user device UE may perform one or more of the steps described with reference to FIG. 3B and to be described with reference to FIG. 7B.

Briefly, the mobile entity ME may request an authentication and initialisation of RAN system 10 from the subscriber module (e.g. the USIM). The mobile entity ME sends the RAND, AUTN received in step S82 and SubNid, to the subscriber module. The subscriber module calculates the RES and the further secret key $K_{fs}$ using the shared secret key K. The subscriber returns the RES to the mobile entity ME.

The ME will send RES as Authentication response to the local MME of the RAN system 10 in step S83. If RES=XRES, then the local MME of the RAN system 10 will send Attach Accept in step S84.

If the user device UE is not capable of communication with RAN system 10 it can still perform the authentication, since the authentication vector AV is based on the shared secret key K. If the user device UE is capable of communication with the RAN system 10, it may indicate this to the RAN system 10 as part of the UE capability signalling, e.g. in step S83.

Figure 6:
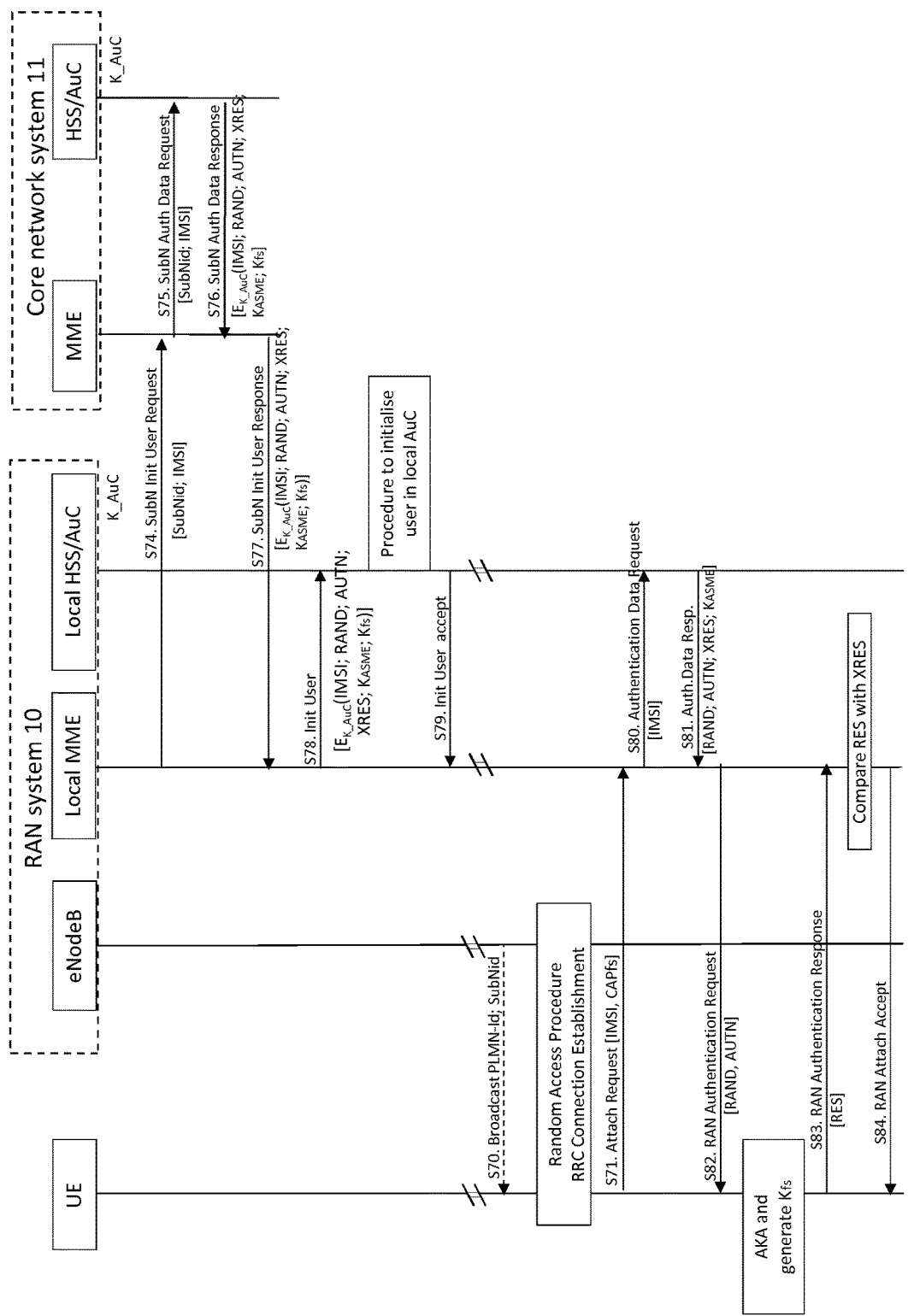
FIG. 6 provides a time diagram illustrating a more detailed security method wherein the core network is disconnected from the radio access network system.

FIG. 6 provides a time diagram illustrating a more detailed security method wherein the core network system 11 is disconnected from the RAN system 10 or the core network system is not available for some reason. The user device is not involved in establishing the further secret key $K_{fs}$ in the RAN system 10.

As can be seen from FIG. 6, similar steps as for FIG. 5 are taken for the security method but the order of the steps is different. In general, the authentication vector AV and the further secret key $K_{fs}$ are pre-provisioned in the RAN system 10, more specifically in the local HSS/AuC. Pre-provisioning of the information can be for a user device UE on the basis of e.g. the IMSI or for several user device (e.g. on the basis of a list of IMSI's). Pre-provisioning may either be triggered by the RAN system 10 or by the core network system 11. Values of the AV are transmitted to the user device UE upon request from the user device UE in order to derive the further secret key $K_{fs}$ in the user device UE.

As already discussed with reference to FIG. 3B, in each of FIG. 5 and FIG. 6, the subscriber module calculates the further secret key $K_{fs}$ and is capable of using this key for local AKA purposes with the RAN system 10.

After the authentication in which the further secret key $K_{fs}$ has been calculated, the $K_{ASME}$ that was derived from the shared secret key K in the core network system 11 is used to secure the communication with the RAN system 10. Only the next time RAN system 10 requests the user device UE to authenticate, the local AuC in RAN system 10 will generate random RAND, and calculate XRES, AUTN, $K_{ASME}$ using the further secret key $K_{fs}$. The user device UE will then perform the authentication based on the further secret key $K_{fs}$. The mobile entity MS signals to the subscriber module that it is now connected to the RAN system 10 (e.g. using the identifier SubNid) in order to select the further secret key $K_{fs}$.

Figure 7B:
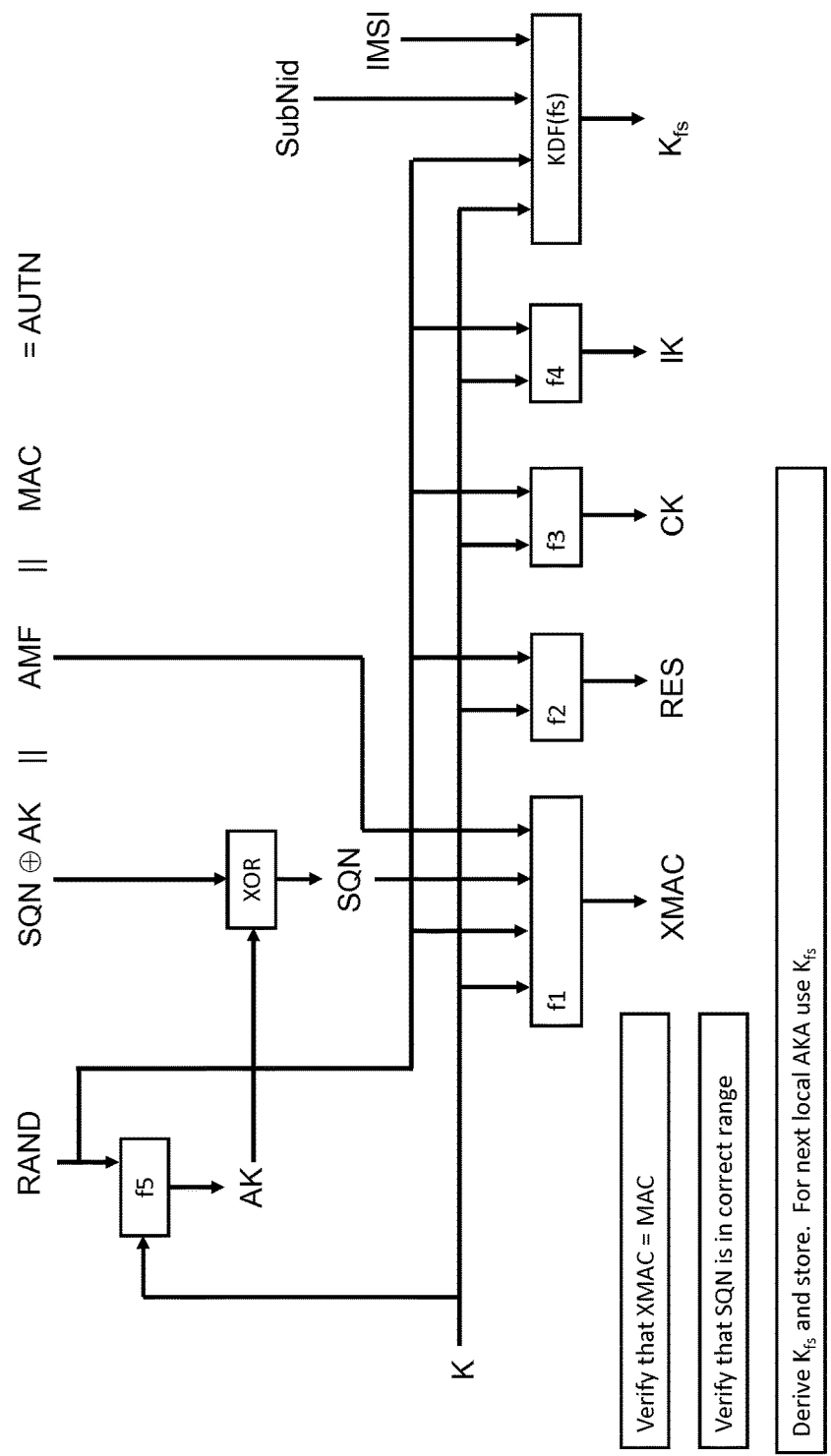

FIGS. 7A and 7B illustrate generation and derivation of the further secret key in the core network system and the user device, respectively, along with other authentication vector values. It should be appreciated that alternative key generation and derivation schemes and algorithms are possible.

In FIG. 7A, the generation of the values of the authentication vector AV and the further secret key $K_{fs}$ in the core network system 11 is illustrated using shared secret key K stored in the core network system 11. The result of the generation may be considered an authentication vector for the RAN system 10, denoted as EPS $AV_{SubN}$ in FIG. 7A.

Authentication vector values XRES, $K_{ASME}$, AUTN and RAND are generated in a manner known as such for LTE telecommunications networks. In addition to this, a key derivation function KDF(fs) is provided for generating the further secret key $K_{fs}$. Input values for generating the further secret key $K_{fs}$ include shared secret key K, random RAND, identifier SubNid of the RAN system 10 and the IMSI.

The use of one or more of the values (e.g. a random number RAND or authentication token AUTN) in deriving the further secret key $K_{fs}$ links the further secret key $K_{fs}$ to the authentication or key agreement procedure in which the user device UE authenticates the core network system 11 by means of one or more of the values (e.g. the authentication token AUTN). This ties the further secret key $K_{fs}$ to the authentication of the core network. The use of the identifier identifying the RAN system 10 (which may be a public identifier) ties the further secret key $K_{fs}$ to a particular radio access network system 10 for which the further secret key $K_{fs}$ is generated, making the further secret key inoperable for other radio access network systems. The use of the identifier of the user device UE (e.g. the IMSI), links the further secret key to a particular user device.

FIG. 7B depicts an exemplary embodiment for deriving the further secret key $K_{fs}$ in the user device UE (more particularly in the subscriber module) on the basis of one or more values of the authentication vector AV. Value RES is generated in a known manner for AKA purposes. Further secret key $K_{fs}$ is derived using again shared secret key K, random RAND, identifier SubNid of the RAN system 10 and the IMSI as illustrated. For a local AKA procedure, the further secret key $K_{fs}$ may now be used.

Figure 8:
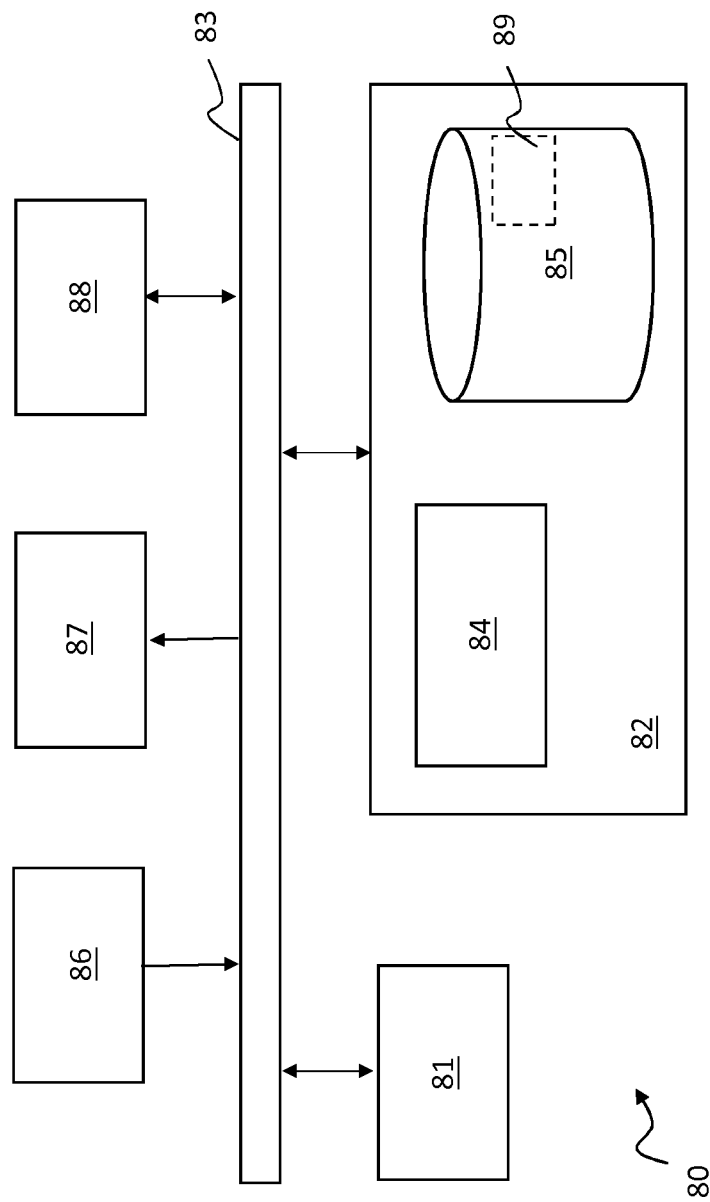
FIG. 8 is a schematic block diagram of an embodiment of a general system or element of a telecommunications network or a user device.

FIG. 8 is a block diagram illustrating an exemplary computer system 80 that may be used in or as a user device UE, in a RAN system 10 (e.g. a base station with core network functionality) or in a core network system 11 (e.g. a node with HSS/AuC functionality)

Data processing system 80 may include at least one processor 81 coupled to memory elements 82 through a system bus 83. As such, the data processing system 80 may store program code within memory elements 82. Further, processor 81 may execute the program code accessed from memory elements 82 via system bus 83. In one aspect, data processing system 80 may be implemented as a computer that is suitable for storing and/or executing program code. It should be appreciated, however, that data processing system 80 may be implemented in the form of any system including a processor and memory that is capable of performing the functions described within this disclosure.

Memory elements 82 may include one or more physical memory devices such as, for example, local memory 84 and one or more bulk storage devices 85. Local memory 84 may refer to random access memory or other non-persistent memory device(s) generally used during actual execution of the program code. A bulk storage device may be implemented as a hard drive or other persistent data storage device. The data processing system 80 may also include one or more cache memories (not shown) that provide temporary storage of at least some program code in order to reduce the number of times program code must be retrieved from bulk storage device 85 during execution.

Input/output (I/O) devices depicted as input device 86 and output device 87 optionally can be coupled to the data processing system 80. Examples of input devices may include, but are not limited to, for example, a keyboard, a pointing device such as a mouse, a touchscreen, or the like. Examples of output device may include, but are not limited to, for example, a monitor or display, speakers, or the like. Input device 86 and/or output device 87 may be coupled to data processing system 80 either directly or through intervening I/O controllers. A network adapter 88 may also be coupled to data processing system 80 to enable it to become coupled to other systems, computer systems, remote network devices, and/or remote storage devices through intervening private or public networks. The network adapter 88 may comprise a data receiver for receiving data that is transmitted by said systems, devices and/or networks to said data processing system 80 and a data transmitter for transmitting data to said systems, devices and/or networks. Modems, cable modems, and Ethernet cards are examples of different types of network adapters that may be used with data processing system 80.

As pictured in FIG. 8, memory elements 82 may store an application 89. It should be appreciated that data processing system 80 may further execute an operating system (not shown) that can facilitate execution of the application. Applications, being implemented in the form of executable program code, can be executed by data processing system 80, e.g., by processor 81. Responsive to executing the application 89, the data processing system 80 may be configured to perform one or more operations as described herein in further detail.

In one aspect, for example, data processing system 80 may represent a user device UE, such as a mobile phone, a portable computer, a tablet, smart glasses, a smart watch, an MTC device etc. In that case, application 59 may represent an application that, when executed, configures data processing system 80 to perform the various functions described herein for the user device UE.

In another aspect, data processing system 80 represents a RAN system 10 or a core network system 11 in which case application 89 is executed to perform one or more of the operations as described herein.

It is noted that the method has been described in terms of steps to be performed, but it is not to be construed that the steps described must be performed in the exact order described and/or one after another. One skilled in the art may envision to change the order of the steps and/or to perform steps in parallel to achieve equivalent technical results.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments have been chosen and described in order to best explain the principles of the disclosure and the practical application, and to enable others of ordinary skill in the art to understand the invention for various embodiments with various modifications as are suited to the particular use contemplated.

Various embodiments of the disclosure may be implemented as a program product for use with a computer system or a processor, where the program(s) of the program product define functions of the embodiments (including the methods described herein). In one embodiment, the program(s) can be contained on a variety of non-transitory computer-readable storage media (generally referred to as "storage"), where, as used herein, the expression "non-transitory computer readable storage media" comprises all computer-readable media, with the sole exception being a transitory, propagating signal. In another embodiment, the program(s) can be contained on a variety of transitory computer-readable storage media. Illustrative computer-readable storage media include, but are not limited to: (i) non-writable storage media (e.g., read-only memory devices within a computer such as CD-ROM disks readable by a CD-ROM drive, ROM chips or any type of solid-state non-volatile semiconductor memory) on which information is permanently stored; and (ii) writable storage media (e.g., flash memory, floppy disks within a diskette drive or hard-disk drive or any type of solid-state random-access semiconductor memory) on which alterable information is stored.

The invention claimed is:

1. A security method in a radio access network system of a telecommunications network providing a wireless radio interface for at least one user device, wherein a shared secret key is stored in both the at least one user device and a core network system of the telecommunications network, the method carried out in the radio access network system and comprising:
receiving a further secret key from the core network system, wherein the further secret key has been derived using the shared secret key stored in the core network system;
providing one or more values over the radio interface to the at least one user device to derive the further secret key in the at least one user device from at least the shared secret key stored in the user device and one or more of the one or more values provided over the radio interface; and
after receiving the further secret key from the core network system, when security functions are not available from the core network system, performing at least one of a local authentication procedure or a local key agreement procedure for the at least one user device over the wireless radio interface using the received further secret key in the radio access network system and the derived further secret key in the at least one user device to enable the user device to communicate via the radio access network without using the core network.

2. The security method according to claim 1, wherein the further secret key received from the core network is derived using at least one:
one or more of the one or more values provided over the radio interface to the user device;
an identifier identifying the radio access network system; or
an identifier of the user device.

3. The security method according to claim 1, further comprising receiving at least the further secret key at the radio access network system in a secure manner.

4. The security method according to claim 1, further comprising receiving one or more values of the one or more values to be provided over the radio interface to the at least one user device from the core network system as an authentication vector for the at least one user device.

5. The security method according to claim 1, further comprising:
receiving at least one of the further secret key and one or more of the one or more values at the radio access network system in response to a trigger, wherein the trigger is optionally provided prior to detecting an inability or unavailability for the radio access network system to handle at least one of an authentication procedure and a key agreement procedure from the core network system.

6. The security method according to claim 1, further comprising:
transmitting a RAN_only indication onto the wireless radio interface when the radio access network system is in a RAN_only mode.

7. The security method according to claim 1, further comprising:
receiving a connection request from the at least one user device to the radio access network system;
determining from the connection request or in response to receiving the connection request that the at least one of the local authentication procedure and the local key agreement procedure is to be performed from the radio access network system.

8. The security method according to claim 1, further comprising:
requesting at least one of the further secret key and one or more of the one or more values from the core network system.

9. The security method according to claim 1, further comprising:
transmitting an identifier of the radio access network system onto the wireless radio interface.

10. The security method according to claim 1, further comprising:
receiving an indication from the user device indicating capability of deriving the further secret key.

11. A non-transitory computer-readable medium having instructions stored thereon that, when executed by one or more processors of a system, cause the system to carry out operations, wherein in the system comprises a radio access network system of a telecommunications network configured for providing a wireless radio interface for at least one user device, wherein a shared secret key is stored in both the at least one user device and a core network system of the telecommunications network, and wherein the operations include:
receiving a further secret key from the core network system, wherein the further secret key has been derived using the shared secret key stored in the core network system;
providing one or more values over the radio interface to the at least one user device to derive the further secret key in the at least one user device from at least the shared secret key stored in the user device and one or more of the one or more values provided over the radio interface; and
after receiving the further secret key from the core network system, when security functions are not available from the core network system, performing at least one of a local authentication procedure or a local key agreement procedure for the at least one user device over the wireless radio interface using the received further secret key in the radio access network system and the derived further secret key in the at least one user device to enable the user device to communicate via the radio access network without using the core network.

12. A radio access network system comprising one or more base stations providing a wireless radio interface for at least one user device, wherein a shared secret key is stored in both the at least one user device and a core network system of a telecommunications network, wherein the radio access network system comprises:
a receiver configured for receiving a further secret key from the core network system, wherein the further secret key is derived using the shared secret key stored in the core network system;
a transmitter configured for, after receiving the further secret key from the core network system, when security functions are not available from the core network system, providing one or more values over the wireless radio interface to the at least one user device to derive the further secret key in the at least one user device from at least the shared secret key stored in the at least one user device and one or more of the one or more values provided over the radio interface; and a computer system configured for performing at least one of a local authentication procedure and a local key agreement procedure for the at least one user device over the wireless radio interface, using the received further secret key in the radio access network system and the further secret key in the at least one user device to enable the user device to communicate via the radio access network without using the core network.

13. The radio access network system according to claim 12, wherein the further secret key received from the core network is derived using at least one:
one or more of the one or more values provided over the radio interface to the user device;
an identifier identifying the radio access network system; or
an identifier of the user device.

14. The radio access network system according to claim 12, wherein receiving the further secret key comprises receiving at least the further secret key in a secure manner.

15. The radio access network system according to claim 12, wherein the receiver is further configured for receiving one or more values of the one or more values to be provided over the radio interface to the at least one user device from the core network system as an authentication vector for the at least one user device.

16. The radio access network system according to claim 12, wherein the receiver is further configured for:
receiving at least one of the further secret key and one or more of the one or more values at the radio access network system in response to a trigger, wherein the trigger is optionally provided prior to detecting an inability or unavailability for the radio access network system to handle at least one of an authentication procedure and a key agreement procedure from the core network system; and
wherein the radio access network system is configured for requesting at least one of the further secret key and one or more of the one or more values from the core network system.

17. The radio access network system according to claim 12, wherein the transmitter is further configured for:
transmitting a RAN_only indication onto the wireless radio interface when the radio access network system is in a RAN_only mode.

18. The radio access network system according to claim 12, wherein the transmitter is further configured for:
transmitting an identifier of the radio access network system onto the wireless radio interface.

19. The radio access network system according to claim 12, wherein the receiver is further configured for:
receiving an indication from the user device indicating capability of deriving the further secret key.

20. The radio access network system according to claim 12, wherein the receiver is further configured for receiving a connection request from the at least one user device to the radio access network system; and
wherein the radio access network system is configured for determining from the connection request or in response to receiving the connection request that the at least one of the local authentication procedure and the local key agreement procedure is to be performed from the radio access network system.

21. A core network system of a telecommunications network configured for operating with a radio access network system, wherein the core network system comprises:
a transmitter;
one or more processors;
memory for for storing a shared secret key, an indication indicating authorization for deriving a further secret key for a user device, and computer instructions that, when executed by the one or more processors, cause the core network system to carry out operations including:
deriving the further secret key using the stored shared secret key, wherein the further secret key enables the user device to communicate with the radio access network when security functions are not available from the core network system by enabling at least one of a local authentication procedure or a local key agreement procedure for the user device to be carried out over a wireless radio interface to the user device using the further secret key in the radio access network system and the further secret key as derived in the user device; and
causing the transmitter to transmit at least the derived further secret key to the radio access network system in response to a request for establishing at least one of an authentication procedure or a key agreement procedure.

22. A user device configured for operating within a radio access network system, the radio access network system comprising one or more base stations providing a wireless radio interface for at least one user device, wherein a shared secret key is stored in both the user device and a core network system of a telecommunications network, wherein the user device comprises:
a receiver configured for receiving one or more values provided over the radio interface from the radio access system;
a storage storing the shared secret key;
a computer system configured for; processing a RAN_only indication indicating that the radio access network in in a RAN-only mode, the RAN_only indication informing the user device that a further key should be derived; and computer system further configured for deriving the further secret key from the shared secret key and at least one of the one or more values received by the receiver, wherein the user device is configured to perform at least one of the local authentication procedure and the local key agreement procedure using the derived further secret key.

23. The user device according to claim 22, wherein the user device is configured for processing an identifier of the radio access network system initiating and/or being used in deriving the further secret key.

24. The user device according to claim 22, wherein the user device is further configured for generating or storing, and transmitting at least one of:
an indication indicating capability to derive the further secret key; or
an indication indicating a request to perform at least one of the local authentication procedure and the local key agreement procedure with the radio access network.

25. A subscriber hardware module for use in the user device, wherein the user device is configured for operating within a radio access network system the radio access network system comprising one or more base stations providing a wireless radio interface for at least one user device, wherein a shared secret key is stored in both the user device and a core network system of a telecommunications network, wherein the subscriber hardware module is configured to store the shared secret key and to derive a further secret key from the shared secret key and at least one of one or more values received by the user device from the radio access network system, wherein the subscriber hardware module is further configured to:

receive a first authentication request causing the subscription module to derive the further secret key; and receive a second authentication request, subsequent to the first authentication request, causing the subscription module to use the further secret key for at least one of a local authentication procedure or a local key agreement procedure, and wherein the user device is configured to perform at least one of the local authentication procedure or the local key agreement procedure using the derived further secret key.

26. The subscriber hardware module according to claim 25, wherein the subscriber hardware module is further configured to store an identifier of the radio access network.

* * * * *